Feb. 20, 1951 — L. D. ADAM ET AL — 2,542,447

FISHING LURE

Filed Jan. 10, 1948

INVENTORS,
Lewis D. Adam,
Nelia G. Poplin.
BY
Harness, Dickey & Pierce.
ATTORNEYS.

Patented Feb. 20, 1951

2,542,447

UNITED STATES PATENT OFFICE 2,542,447

FISHING LURE

Lewis D. Adam, Detroit, Mich., and Nelia G. Poplin, Ponca City, Okla.

Application January 10, 1948, Serial No. 1,505

2 Claims. (Cl. 43—42.47)

1

This invention relates generally to fish lures and more particularly to a bait casting or trolling lure of the deep running type having a forwardly projecting bill secured to the front portion of the body thereof and having improved means for rigidly supporting the bill so as to reduce any danger of damage to the latter.

The fish lure of this invention is primarily adapted for use as a deep running lure and incorporates a scooplike, forwardly projecting bill which is secured to the front end of the body of the lure for causing the same to dive when pulled through the water. The bill of a fish lure of this type must be accurately positioned and arranged with respect to the body of the lure so that the lure will have the proper diving characteristics, and any damage or deformation of the bill will affect the diving characteristics of the lure. Deep running fish lures often encounter rocks or other obstructions near the bottom of the body of water in which they are being used or strike rocks when cast with the result that the bill is subject to damage which frequently renders the lure ineffective and inoperative.

This invention has for its principal object the provision of an improved brace or supporting means for the bill of a fish lure, which includes a rear portion secured to the lure body, an intermediate portion which extends parallel to and closely adjacent to a portion of the underside of the bill, and a forward eye portion which projects upwardly through the bill and to which a fishing line is adapted to be attached for pulling the lure through the water. This improved type of supporting means increases the efficiency and life of the fish lure in that it reinforces the bill in a far more efficient manner than has heretofore been accomplished and as the brace extends parallel and closely adjacent to the bill, it does not interfere with the flow of water over the bill or the lure nor does it affect the diving characteristics thereof. The brace therefore provides a fish lure in which the bill is rigidly supported so as to be less susceptible to deformation and damage if it strikes any rock or projection.

Figure 1:
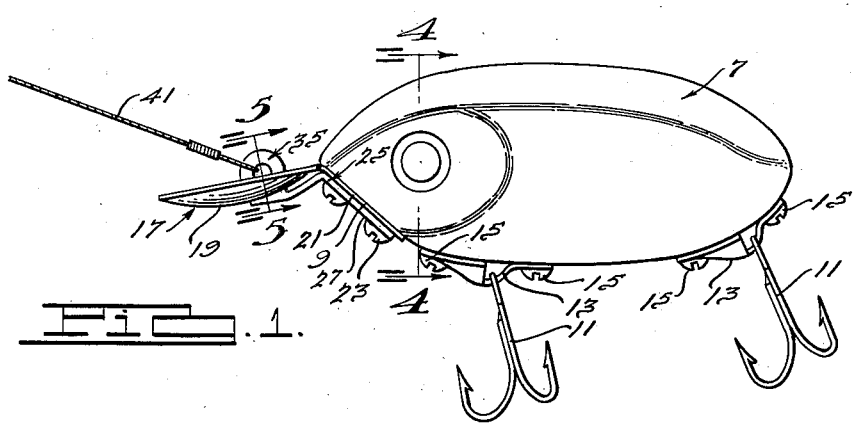
Figure 2:
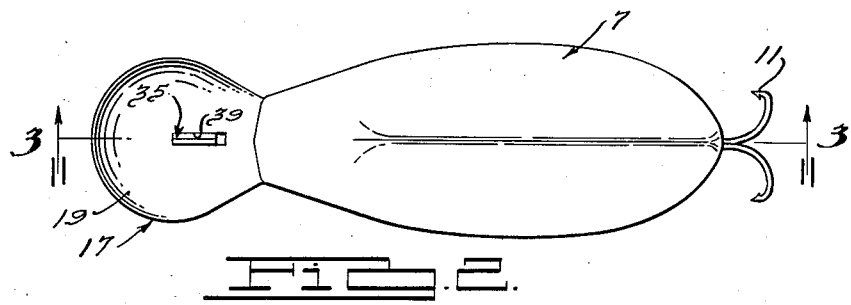
Figure 3:
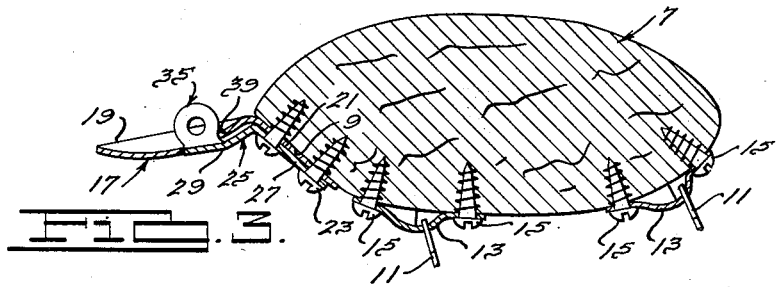

Other objects of this invention will become apparent from the following detailed description taken in conjunction with the accompanying drawing, in which Figure 1 is a side elevational view of the fish lure of this invention, Fig. 2 is a top plan view of the structure illustrated in Fig. 1, Fig. 3 is a longitudinal sectional view of the

Figure 4:
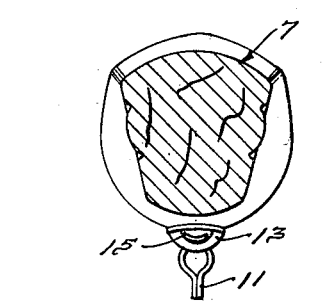
Figure 5:
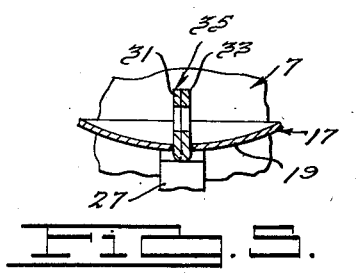

2 structure illustrated in Fig. 2 taken substantially along the line 3—3 thereof,

Fig. 4 is a transverse sectional view of the structure illustrated in Fig. 1 taken substantially along the line 4—4 thereof, and Fig. 5 is a sectional view of the structure illustrated in Fig. 1 taken along the line 5—5 thereof.

Referring now to the drawing, it will be seen that the fish lure includes a body 7, which may be made of any suitable material such as wood or plastic, and which may be solid or hollow. The body 7 is illustrated in the drawing as being formed from a solid block of wood and is shaped so that the rear portion thereof will have considerable buoyancy. This tends to elevate the rear portion and thereby increase the diving angle. The underside of the front end of the body 7 is angularly cut back so as to provide an angular front face 9. Hooks 11 are secured to the underside of the body 7, adjacent the rear end thereof and intermediate the longitudinal ends thereof, by means of suitable brackets 13 and screws 15.

A bill 17, including a forwardly projecting scoop-like portion 19 and an angularly extending platelike portion 21, is secured to the front portion of the lure body 7. The bill 17 is secured to the inclined body front face 9 by means of screws 23 which secure the bill platelike portion 21 against the angular front face 9 so that the scoop portion 19 extends forwardly of the lure body 7, at a slight angle below the horizontal. The location of the bill 17 with respect to the body 7, as well as the shape of the bill, must be so coordinated with the shape of the body 7, that when the lure is pulled through the water at ordinarily retrieving or trolling speeds it will run deep.

A brace 25 is provided for reinforcing the bill 17 so as to lessen any danger of deformation or damage thereto if it should strike an obstruction such as a rock or projection on the bottom of the body of water through which the lure is being pulled. The brace 25 includes a rear platelike portion 27 which engages the underside of the bill plate portion 21 and is secured to the latter and to the body 7 by the aforementioned screws 23. The brace 25 includes an intermediate portion 29 which is shaped so as to extend substantially parallel and closely adjacent to the underside of the bill scoop portion 19. The forward portion of the brace 25 is initially formed as a pair of eyes 31 and 33 which extend transversely outwardly on opposite sides of the intermediate brace portion 25, in the plane of the latter. The eyes 31 and 33, prior to the assembly of the fish lure, are bent upwardly into side-by-side relationship, as best illustrated in Fig. 5, so as to provide an upstanding eye generally indicated at 35, which, when the reinforcing element is secured to the bill 17 and body 7, projects upwardly through a slot 39 in the scoop portion of the bill. A fishing line 41 may be secured to the eye 35 for use in pulling the lure through the water.

It will be appreciated that as the intermediate portion 29 of the brace 27 extends parallel and closely adjacent to the underside of the scoop portion 19, the lure is better balanced and will travel through the water in a more efficient manner than if the intermediate portion 29 extended angularly with respect to the bill scoop portion 19. Likewise, it will be appreciated that the construction and manner of forming the eye 35 of the brace 25 permits the brace to be formed in a relatively inexpensive and efficient manner, while at the same time permitting the intermediate portion 29 to extend parallel to the underside of the bill scoop portion. A ruggedly constructed eye 35 is thus provided to which the fish line 41 may be attached.

The fish lure of this invention is thus efficiently designed and constructed so as to be deep running, and the bill is reinforced so that it will not be easily deformed or damaged so as to throw the lure out of balance and render it ineffective for the deep running action for which it is designed.

We claim:

1. A fish lure including a body, a forwardly projecting bill having a portion engaging the front end of said body and a portion projecting forwardly of said body, having a substantially central elongated opening therein, a reinforcing element for said bill including a rear portion lying against the portion of said bill engaging said body, means rigidly securing said bill and element portions to said body, an intermediate portion of said element extending throughout its entire length substantially parallel and closely adjacent to the underside of said bill so as to reinforce the same, and a forward portion projecting upwardly through the opening in the forwardly projecting portion of said bill and forming an eye to which a fishing line is adapted to be attached, the forward edge of said reinforcing element forward portion abutting the portion of said forwardly projecting bill portion which defines the forward edge of said bill opening.

2. A fish lure including a body, a forwardly projecting bill secured to the front end of said body, a one piece sheet metal reinforcing element for said bill including a rear portion secured to said body, an intermediate portion extending substantially parallel and closely adjacent to the underside of the said bill so as to reinforce the same, and a forward portion comprising integral folded sections disposed in an upstanding side-by-side relationship and projecting upwardly from said reinforcing element intermediate portion and through said bill so as to provide an eye to which a fishing line is adapted to be attached.

LEWIS D. ADAM.
NELIA G. POPLIN.

REFERENCES CITED

The following references are of record in the file of this patent:

UNITED STATES PATENTS

| Number | Name | Date |
|---|---|---|
| 1,840,273 | Lang | Jan. 5, 1932 |
| 1,982,081 | Stage | Nov. 27, 1934 |
| 2,190,791 | Larson | Feb. 20, 1940 |
| 2,217,789 | Bobo | Oct. 15, 1940 |
| 2,234,439 | Larson | Mar. 11, 1941 |
| 2,313,709 | Dunkelberger | Mar. 9, 1943 |
| 2,473,324 | Adam | June 14, 1949 |